United States Patent [19]

Maeda et al.

[11] Patent Number: 5,051,273
[45] Date of Patent: Sep. 24, 1991

[54] METHOD OF PREPARATION OF A PATTERNED DECORATIVE MATERIAL

[75] Inventors: Kenzou Maeda, Yokohama; Haruki Ito, Chigasaki, both of Japan

[73] Assignee: Nippon Oil and Fats Company, Limited, Tokyo, Japan

[21] Appl. No.: 464,403

[22] Filed: Jan. 12, 1990

[51] Int. Cl.$^5$ .................. B05D 5/00; B05D 1/06; B05D 1/10; B05D 1/24
[52] U.S. Cl. .................. 427/14.1; 427/185; 427/194; 427/195; 427/198; 427/423
[58] Field of Search .................. 427/27, 29, 33, 194, 427/195, 277, 278, 264, 270, 423, 198, 185, 14.1; 264/134, 293, 320, 339

[56] References Cited

U.S. PATENT DOCUMENTS

| | | |
|---|---|---|
| 3,281,258 | 10/1966 | Callahan .................. 264/293 |
| 3,989,775 | 11/1976 | Jack et al. .................. 264/266 X |
| 4,256,446 | 3/1981 | Hinojosa et al. .................. 425/115 |

FOREIGN PATENT DOCUMENTS

| | | |
|---|---|---|
| 131257 | 1/1985 | European Pat. Off. . |
| 0178741 | 4/1986 | European Pat. Off. . |
| 3041869 | 7/1982 | Fed. Rep. of Germany . |
| 49-55727 | 5/1974 | Japan .................. 427/195 |
| 58-58156 | 12/1983 | Japan .................. 427/195 |
| 2003089 | 3/1979 | United Kingdom . |

*Primary Examiner*—Evan Lawrence
*Attorney, Agent, or Firm*—Frishauf, Holtz, Goodman & Woodward

[57] ABSTRACT

A patterned decorative material is prepared by a method which comprises application of a thermosetting powder coating material to a base plate; melting of the thermosetting powder coating material by heating; embossing of the coating layer alone while the melt thermosetting powder coating material has a gel fraction formed by a hardening reaction of 15 to 75 weight percent; and further heating to form a hardened coating on the base plate. The prepared patterned decorative material is excellent in appearance, corrosion resistance, weathering resistance and abrasion resistance and free from the defects of conventional steel plates coated with polyvinyl chloride and the like, such as formation of craze and loss of luster.

11 Claims, 2 Drawing Sheets

METHOD OF PREPARATION OF A PATTERNED DECORATIVE MATERIAL

BACKGROUND OF THE INVENTION

1. Field of the Invention

The present invention relates to a novel method of preparation of a patterned decorative material. In more detail, the invention relates to a method of efficient preparation of a patterned decorative material having embossing on a powder coating layer which has an excellent corrosion resistance, weathering resistance and abrasion resistance, has an excellent durability without formation of craze or loss of luster in the coating even after a prolonged usage and advantageously can be utilized in building materials, electric appliances, furnitures and the like.

2. Prior art

For the purpose of giving atmosphere of high grade, patterned decorative materials excellent in appearance and touch are utilized in building materials such as wall materials and interior materials of buildings, housing materials of electric appliances, furnitures and the like.

Embossing has been known as one of the methods of preparation of such patterned decorative materials. Among such embossed patterned decorative materials, embossed steel plates are manufactured commercially and are utilized in various applications.

The embossed steel plates are usually prepared by coating and baking a layer of plastisol or organosol made of vinyl chloride resins on a steel plate to form a coated steel sheet and embossing the sheet after the baking is finished. The thickness of the coating is generally in the range from 300 to 500 micrometer in the case of a plastisol coating and in the range from 70 to 100 micrometers in the case of an organosol coating (Japanese Patent Publication No. Showa 61-57073).

However, embossed steel plates prepared according to this method have a defect that, because the plastisol or the organosol used for the coating material contains a large amount of plasticizer such as dioctyl phthalate, the coating layer inevitably loses the plasticizer during the prolonged period of utilization and thus formation of craze and loss of luster are unavoidable.

Another method utilized for a similar purpose is that a coating material containing vinyl chloride resin and a thermoplastic resin is coated to varying thickness to form a striped pattern by using a roll so that the resulting coating layer has a decorative pattern by the effect of the variation of thickness (Japanese Patent Publications No. Showa 61-54470 and No. Showa 61-54471). However, a thickness in the range from 150 to 250 micrometers is required in order to have a decorative pattern according to this method and productivity is unavoidably decreased.

On the other hand, the method of powder coating is excellent in processability, gives a coating excellent in weathering resistance and abrasion resistance, is a typical material-saving process and a typical non-hazardous process to the environment and, thus, has been attracting interest during these years. The method is utilized widely in coatings of industrial products like outdoor durable structures such as iron frame materials for buildings, guard rails, fences, street lights and gates, steel furnitures, electric appliances and coatings to replace glass lining.

However, when a coating layer is embossed after the coating layer is completely made on the surface of a substrate by applying a powder coating material on the substrate followed by baking of the coating material, the coating has problems that craze is formed at the edge of the pattern where the thickness of the coating layer varies and that some parts of the coating layer are extremely thin so that the coating is inferior in corrosion resistance during a long period of usage and, as the result, the coating cannot be utilized for a prolonged period. For these reasons, embossed steel plates applied with powder coatings are actually not utilized for practical purposes.

SUMMARY OF THE INVENTION

The present invention accordingly has an object to provide a method of preparation of a patterned decorative material by utilizing an embossing process in which thermosetting resins without a plasticizer or the like are utilized and the material prepared has excellent resistance against corrosion, weathering and abrasion and has excellent durability so that formation of craze or loss of luster does not take place even after a prolonged usage.

One of the the methods of preparation of a patterned decorative material of the invention comprises application of a thermosetting powder coating material to a base plate; melting of the thermosetting powder coating material by heating; simultaneous embossing of the coating layer and the base plate while the melt thermosetting powder coating material has a gel fraction formed by a hardening reaction in the range from 0 to 75 weight percent and further heating to form a hardened coating on the base plate.

Another of the methods of preparation of a patterned decorative material comprises application of a thermosetting powder coating material to a base plate; melting of the thermosetting powder coating material by heating; embossing of the coating layer alone while the melt thermosetting powder coating material has a gel fraction formed by a hardening reaction in the range from 15 to 75 weight percent and further heating to form a hardened coating on the base plate.

Numbers in the figures are: 1; a base plate substrate, 2; a powder coating machine, 3; a heating furnace, 4(A), 4(B), 4'(A) and 4'(B); embossing rolls, 5; a baking furnace and 6; a coated and embossed decorative material.

DETAILED DESCRIPTION OF THE PREFERRED EMBODIMENTS

Methods of achieving the object described above were intensively investigated by the inventors and it was discovered that, because there are two kinds of embossing processes, namely, simultaneous embossing of the coating layer and the base plate and embossing on the coating layer alone leaving the base plate intact, each of the embossing processes must be conducted under the optimum condition determined for each of them.

The inventors discovered, at first, that, when the embossing is made simultaneously on both of the coating layer and the base plate, the temperature of melting by heating and the temperature of the hardening reaction are different, that the coating layer can be kept at a fluid condition for a certain period of time and that the embossing can be conducted effectively during this period of time.

The inventors further discovered that, when the embossing is made on the coating layer alone, the condition of hardening must be limited within certain range rigorously and that a beautifully decorated material can be prepared if the embossing is made while the gel content of the coating layer is within certain range.

The invention thus completed to achieve the object is explained in detail in the following.

According to the invention, the embossing is made while the coating layer is still in a fluid condition and then the embossed coating layer is baked to form a hardened layer. By applying this process, the defects found in the processes in the prior arts such as formation of craze at the edge of decoration and formation of spots of extremely thin coating can be prevented.

As the powder coating material of the invention, all kinds of thermosetting powder coating material can be utilized as is evident from the mechanism of the process of the preparation.

Figure 3:
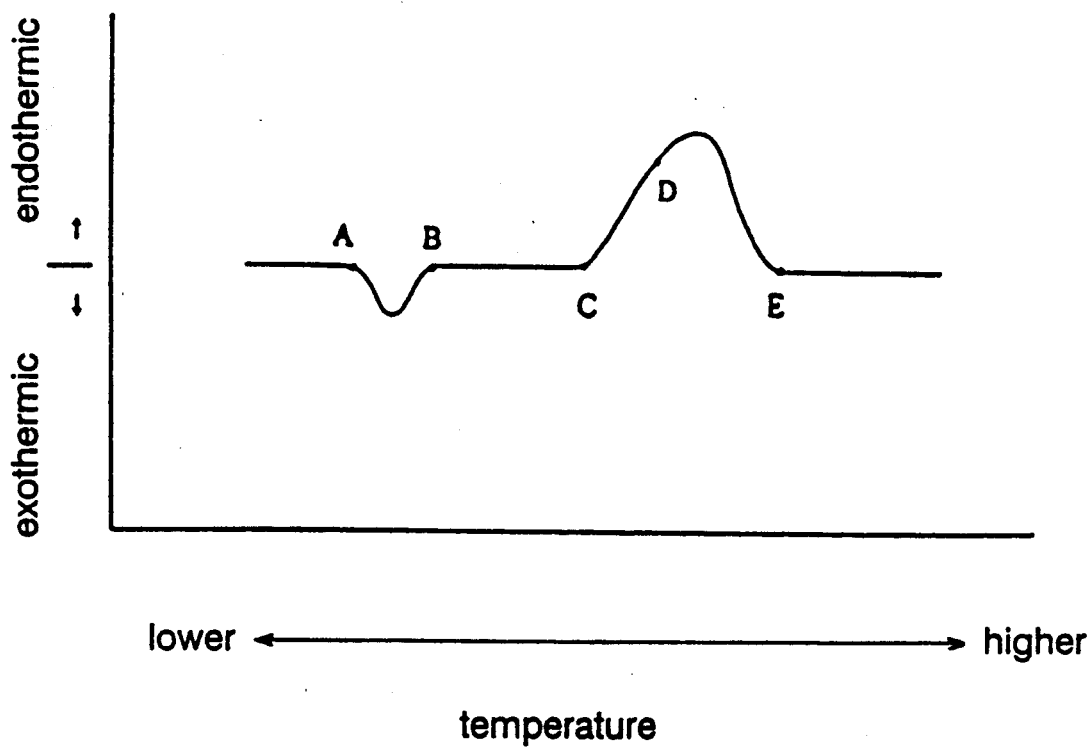
FIG. 3 is an example of the usual chart of differential thermal analysis of a thermosetting powder coating material.

For example, FIG. 3 shows a result of a differential thermal analysis on a conventional thermosetting powder coating material (Metal Finishing, March, 1979, page 68). The curvature between A and B in FIG. 3 shows an endothermic process caused by the melting of the resin and the curvature between C and E in the same figure shows an exothermic reaction of the resin and the crosslinking reagent. The coating layer remains fluid in the condition between B and C and is still remaining fluid in the condition between C and D even though the reaction already started. The process of embossing can be conducted during the condition between B and D in which the gel content of the coating layer is in the range from 0 to 75 percent.

When the rate of increase of temperature during the period described herein is adjusted depending on the rate of the hardening reaction, the conditions of the process of embossing is adjusted to suit all kinds of thermosetting powder coating materials.

As the base plate utilized in the invention, a plate having a flat shape is more suitable because the local accumulation of the resin is more easily avoided. However, the shape of the base plate is not limited to a flat shape, but a plate having a curvature can also be utilized.

Examples of the base plate utilized are steel plates such as plates of thick to medium thickness, thin plates and zinc plated plates, aluminum plates, wooden plates, plywoods, plastic plates and the like and steel plates are preferably utilized. When the embossing is made on both of a coating layer and a base plate, a base plate having no malleability, such as a wooden plate, cannot be utilized.

In the process of embossing of the invention, at first, a powder coating material which comprises a thermosetting resin as the main component is applied to the surface of a base plate. However, it is the generally utilized practice that conditioning of the surface of the base plate is made prior to the application of the coating material.

The conditioning of the surface of the base plate is made for the purpose of making the condition of the surface so that the coating layer can adhere to the surface of the base plate tightly and assuring the durability of the coating layer during a prolonged period. The method of conditioning is not particularly limitative and any of the conventionally utilized methods can be used depending on the properties of the base plate. For example, when a steel plate is utilized as the flat base plate, the methods of the conditioning generally utilized are a degreasing treatment, a rust removing treatment, chemical coating treatment and the like.

When it is desired, coating of a primer may be applied to the surface of the base plate conditioned as described above for the purpose of increasing the adhesion of the powder coating layer to the surface.

A coating material which has affinity to both of the base plate and the powder coating layer is suitable for the primer coating. The primer coating functions as an adhesion mediator between the powder coating and the base plate and the thickness of the coating layer of 10 micrometer is satisfactory. Generally, the primer coating is dried by baking after it is applied to the surface.

The powder coating material utilized in the invention is not particularly limitative so long as it comprises a thermosetting resin as the main component. Examples of such thermosetting resins are epoxy resins, polyester resins, acrylic resins, fluorohydrocarbon resins and the like and they are utilized either alone or as a mixture of two or more kinds.

The crosslinking agents utilized in the invention are, for example, melamine resins, blocked polyisocyanate compounds, urethodione compounds, triglycidyl isocyanurate (TGIC) compounds which contain glycidyl groups or glycidyl groups and hydroxyl groups, polybasic acids, amine compounds, amides and the like and they are utilized either alone or as a mixture of two or more kinds.

The thermosetting powder coating material of the invention thus prepared can be compounded with coloring pigments, metal powders, additives and catalysts according to requirements. Examples of such coloring pigments are inorganic pigments such as titanium dioxide, iron oxide, carbon black and the like, organic pigments such as phthalocyanine blue, phthalocyanine green, quinacridone pigments, isoindolinone pigments and the like and fillers such as talc, silica, calcium carbonate, barium sulfate and the like. Examples of such metal powders are aluminum powder, copper powder and the like. Examples of such additives are mica powder, leveling agents, ultraviolet light absorbents, stabilizers against thermal degradation, foam preventing agents and the like. Examples of such catalysts are organotin compounds and the like.

The thermosetting powder coating material of the invention can be prepared according to conventionally practiced methods.

The method of application of the powder coating material of the invention to the surface of the base plate is not limitative but conventionally practiced methods for the application of a powder coating material such as flame spray coating, fluidized bed coating, electrostatic spray coating, corona discharge coating, friction electrostatic spray coating, electrostatic fluidized bed coating and the like can be utilized.

The electrostatic spray coating is a preferable method among these methods. In the electrostatic spray coating, powders of the coating material are negatively charged by passage through a nozzle of a spray gun which is impressed with a high voltage of more than −70,000 volts, sprayed to an earthed substrate and attached to the surface of the substrate by electrostatic force.

In the method of the invention, the base plate, the surface of which is conditioned and, if desired, coated with a primer, is preheated to 50° to 80° C. if necessary and the thermosetting resin powder coating material is applied to the surface by utilizing one of the methods described above. The thickness of the coating layer is generally selected to be in the range from 30 to 200 micrometers.

The coated plate is heated to a temperature above the melting point of the powder coating material so that the coating material melts and is embossed by using rolls or presses while the coating material maintains its fluidity. It is an advantageous practice that the rolls or the presses utilized are cooled with water or coated with an fluorohydrocarbon resin so that the powder coating material does not adhere to the roll or the press while it is still fluid. Examples of the fluorohydrocarbon resins advantageously utilized are resins having a high degree of anti-adhesiveness such as tetrafluoroethylene resins, trifluoroethylene resins and the like.

When the embossing is made on both of the coating layer and the base plate simultaneously according to the method of the invention, the embossing is made before the completion of the hardening while the gel fraction of the coating layer is in the range from 0 to 75 weight percent, preferably in the range from 0 to 60 weight percent, and the hardening reaction is completed after the embossing is done. By utilizing this method, strain is not left remaining in the material and the formation of craze is avoided. When the gel fraction of the coating layer is more than 75 percent, craze is formed at embossed portions and the quality of the product is bad.

When the embossing is made on the coating layer alone according to the other method of the invention, it is required that the embossing is made during the process of hardening when the gel fraction of the coating layer is in the range from 15 to 75 weight percent, preferably in the range from 25 to 60 weight percent.

When the gel fraction is less than 15 weight percent, the shape of the patterned decoration is deformed by heat after the embossing is completed and the patterned decoration cannot be obtained as accurately as it is designed. When the gel fraction is more than 75 weight percent, the powder coating layer acquires rubbery elasticity and the variation in the thickness is not formed as it is designed, resulting in bad appearance of the coating layer.

The gel fraction described in the invention is obtained by the following method: a portion of the coating layer is taken as a sample; the sample is extracted with tetrahydrofuran for 5 hours under reflux; the residue of the extraction is dried; and the weight fraction of the residue against the total sample is calculated.

In the practice of the invention, it is desirable that the change of the gel fraction depending on the pattern of heating during the preparation process is measured by experiments in advance and the most suitable gel fraction is selected by selecting a suitable time of heating according to the data thus obtained.

In the method of the preparation of the invention, the embossed material is baked in a baking furnace at the temperature in the range from 150° to 250° C. for the time in the range from 1 to 30 minutes to complete the hardening reaction.

Thus, the embossed pattern can be completed without formation of a strain caused by the process.

The method of the preparation of the invention can be conducted continuously while all of the processes are made by transferring materials on a conveyer belt continuously.

In the following, examples of favorable practices of the methods of the invention are given to illustrate the methods of the invention in more detail with reference to the attached drawings.

EXAMPLE 1

Figure 1:
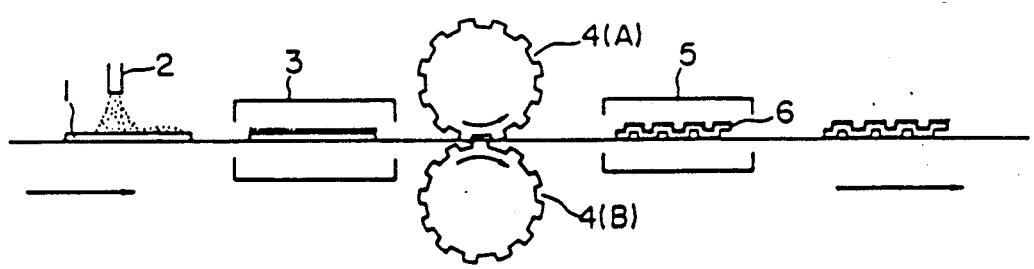
FIG. 1 is a schematic diagram of the coating process line utilized for embossing of both of the coating layer and the base plate simultaneously.

FIG. 1 shows the process of embossing when both of the powder coating layer and the base plate are embossed simultaneously.

The process shown in FIG. 1 is an example of the favorably practiced coating line of the invention. The substrate, 1, is a flat plate which is treated in the processes I through IV.

In the process I, a steel plate which has been treated with a degreasing process, a rust removing process and a chemical coating process in advance is used as a base plate. A polyester powder coating material is sprayed on the surface of the steel plate to form a coating layer of thickness of about 50 micrometer by electrostatic spray coating method using spraying machine GX-108 manufactured by Onoda Cement Co., Ltd.

In the process II, the steel plate with the coating layer is heated to 200° C. for 2 minutes by passing the plate through a heating furnace, 3, and the powder coating material is made fluid by melting.

In the process III, the steel plate with the coating layer is passed through embossing rolls, 4(A) and 4(B), and embossing is made on both of the powder coating layer and the steel base plate as shown by 6.

In the process IV, the embossed plate is passed through a baking furnace, 5, of temperature of 250° C. in 5 minutes, the hardening reaction of the coating layer is completed and the embossed steel plate, 6, is prepared.

The embossed steel plate thus prepared had a beautiful appearance and showed no craze at all.

During the process of the embossing, a portion of the coating layer at the edge of the plate is taken as a sample at the moment when the portion passes through the embossing roll and gel fraction is measured with the sample. In Table 1 are shown the kind of coating material utilized, conditions for the process II, gel fraction measured, conditions for the process IV and appearance of the plate prepared.

EXAMPLES 2 THROUGH 7 AND COMPARATIVE EXAMPLES 1 THROUGH 3

A steel base plate and a coating layer on the surface of the steel plate are embossed simultaneously by the same process as that of Example 1 except that different kinds of coating material, different conditions for the process II and different conditions for the process IV are employed. In Table 1 are shown the kind of coating material utilized, conditions for the process II, gel fraction measured, conditions for the process IV and appearance of the plate prepared.

TABLE 1

(Part 1)

|  | Example 1 | Example 2 | Example 3 | Example 4 | Example 5 |
|---|---|---|---|---|---|
| Thermosetting powder coating material | Konac No. 1600 White[1] | Konac No. 2500 White[2] | Konac No. 3700 White[3] | Konac No. 4600 White[4] | Konac No. 4600 White[4] |
| Heating condition |  |  |  |  |  |
| Temperature (°C.) | 200 | 200 | 200 | 200 | 200 |
| Time (min.) | 2 | 1 | 1 | 1 | 2 |
| Gel fraction (%)[5] | 30 | 26 | 63 | 41 | 64 |
| Hardening condition |  |  |  |  |  |
| Temperature (°C.) | 250 | 250 | 250 | 250 | 250 |
| Time (min.) | 5 | 5 | 3 | 3 | 3 |
| Appearance of the coating[6] | good | good | good | good | good |

(Part 2)

|  | Example 6 | Example 7 | Comparative Example 1 | Comparative Example 2 | Comparative Example 3 |
|---|---|---|---|---|---|
| Thermosetting powder coating material | Konac No. 4600 Clear[7] | Konac No. 9000 White[8] | Konac No. 1600 White[1] | Konac No. 4600 White[4] | Konac No. 4600 Clear[7] |
| Heating condition |  |  |  |  |  |
| Temperature (°C.) | 200 | 200 | 230 | 230 | 230 |
| Time (min.) | 1 | 2 | 4 | 4 | 4 |
| Gel fraction (%)[5] | 39 | 52 | 78 | 88 | 83 |
| Hardening condition |  |  |  |  |  |
| Temperature (°C.) | 250 | 250 | 250 | 250 | 250 |
| Time (min.) | 3 | 3 | 5 | 3 | 3 |
| Appearance of the coating[6] | good | good | bad | bad | bad |

[1]Trade name of a polyester resin powder coating material manufactured by Nippon Yushi Co., Ltd. (A polyurethane type material in which a polyester resin is used as the resin component and a blocked isocyanate compound is used as the crosslinking agent)

[2]Trade name of an epoxy/polyester resin powder coating material manufactured by Nippon Yushi Co., Ltd. (A hybrid type material in which an epoxy resin and a polyester resin are used)

[3]Trade name of an epoxy resin powder coating material manufactured by Nippon Yushi Co., Ltd. (A material in which an epoxy compound is used as the resin component and an amine compound is used as the crosslinking agent)

[4]Trade name of an acrylic resin powder coating material manufactured by Nippon Yushi Co., Ltd. (A material in which an acrylic resin is used as the resin component and a dibasic acid is used as the crosslinking agent)

[5]Measured on a sample of the coating layer according to the following equation after the sample is refluxed with tetrahydrofuran for 5 hours followed by drying in vacuo at 50° C. for 5 hours:
gel fraction = (weight after the treatment/original weight) $\times$ 100

[6]good: the coating layer has a distinct pattern by variation of the thickness and no crazing is found. bad: the coating has a pattern by variation of the thickness but crazing is found.

[7]Trade name of an acrylic resin powder coating material manufactured by Nippon Yushi Co., Ltd. (A material in which an acrylic resin is used as the resin component and a dibasic acid is used as the crosslinking agent)

[8]Trade name of a polyester resin powder coating material manufactured by Nippon Yushi Co., Ltd. (A TGIC type material in which a polyester resin is used as the resin component and TGIC is used as the crosslinking agent)

EXAMPLE 8

Figure 2:
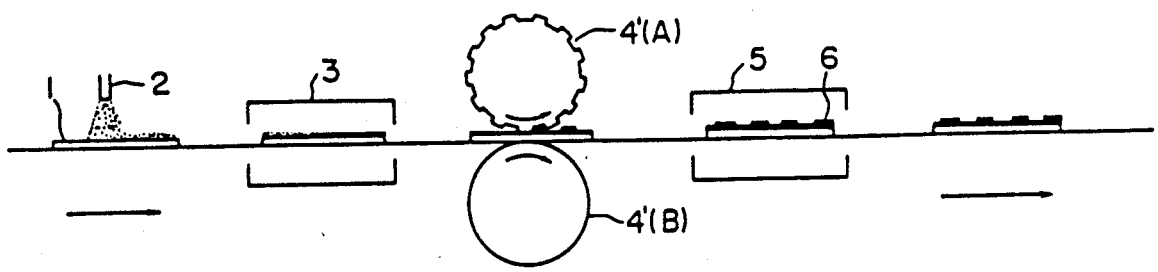
FIG. 2 is a schematic diagram of the coating process line utilized for embossing the coating layer alone.

FIG. 2 shows the process of embossing when the powder coating layer alone is embossed.

The process shown in FIG. 2 is an example of the favorably practiced coating line of the invention. The substrate, 1, is a flat plate which is treated in the processes I through IV.

In the process I, a steel plate which has been treated with a degreasing process, a rust removing process and a chemical coating process in advance is used as a base plate. A polyester powder coating material is sprayed on the surface of the steel plate to form a coating layer of thickness of about 50 micrometer by electrostatic spray coating method using spraying machine GX-108 manufactured by Onoda Cement Co., Ltd.

In the process II, the steel plate with the coating layer is heated to 200° C. for 2 minutes by passing through a heating furnace, 3, and the powder coating material is made fluid by melting.

In the process III, the steel plate with the coating layer is passed through embossing rolls, 4'(A) and 4'(B), and embossing is made on the powder coating layer alone as shown by 6.

The embossing rolls utilized for the embossing of the coating layer comprise two kinds of rolls. One of them, 4'(A), is located on the upper side of the plate and equipped with a pattern for the embossing. The other roll, 4'(B), is located on the lower side of the plate and the surface is plain without a pattern.

In the process IV, the embossed plate is passed through a baking furnace, 5, of temperature of 250° C. in 5 minutes, the hardening reaction of the coating layer is completed and the steel plate embossed on the coating layer alone, 6, is prepared.

The embossed steel plate thus prepared had a pattern with varied thickness, a beautiful appearance and showed no craze at all.

During the process of the embossing, a portion of the coating layer at the edge of the plate is taken as a sample at the moment when the portion passes through the embossing roll and gel fraction is measured with the sample. In Table 2 are shown the kind of coating material utilized, conditions for the process II, gel fraction measured, conditions for the process IV and appearance of the plate prepared.

TABLE 2

(Part 1)

| | Example | | | | | |
|---|---|---|---|---|---|---|
| | 8 | 9 | 10 | 11 | 12 | 13 |
| Thermosetting powder coating material | Konac No. 1600 White[2] | Konac No. 2500 White[2] | Konac No. 3700 White[2] | Konac No. 4600 White[2] | Konac No. 9000 White[2] | Konac No. 9000 Clear[2] |
| Heating condition | | | | | | |
| Temperature (°C.) | 200 | 200 | 200 | 200 | 200 | 200 |
| Time (min.) | 2 | 2 | 1 | 1 | 1 | 2 |
| Gel fraction (%) | 30 | 38 | 63 | 41 | 32 | 59 |
| Hardening condition | | | | | | |
| Temperature (°C.) | 250 | 250 | 250 | 250 | 250 | 250 |
| Time (min.) | 5 | 5 | 3 | 3 | 5 | 5 |
| Appearance of the coating[1] | good | good | good | good | good | good |

(Part 2)

| | Comparative Example | | | | | |
|---|---|---|---|---|---|---|
| | 4 | 5 | 6 | 7 | 8 | 9 |
| Thermosetting powder coating material | Konac No. 1600 White[2] | Konac No. 1600 White[2] | Konac No. 4600 White[2] | Konac No. 4600 White[2] | Konac No. 9000 White[2] | Konac No. 9000 Clear[2] |
| Heating condition | | | | | | |
| Temperature (°C.) | 180 | 230 | 180 | 230 | 180 | 230 |
| Time (min.) | 2 | 4 | 1 | 4 | 1 | 4 |
| Gel fraction (%) | 5 | 78 | 8 | 88 | 7 | 85 |
| Hardening condition | | | | | | |
| Temperature (°C.) | 250 | 250 | 250 | 250 | 250 | 250 |
| Time (min.) | 5 | 5 | 3 | 3 | 5 | 5 |
| Appearance of the coating[1] | bad | bad | bad | bad | bad | bad |

[1] good: the coating layer has a pattern by variation of the thickness
bad: the coating layer does not have a pattern by variation of the thickness
[2] Trade names of the powder coating materials are the same as those in Table 1.

EXAMPLES 9 THROUGH 13 AND COMPARATIVE EXAMPLES 4 THROUGH 9

A coating layer alone on a steel plate is embossed by the same process as that of Example 8 except that different kinds of coating material, different conditions for the process II and different conditions for the process IV are employed. In Table 2 are shown the kind of coating material utilized, conditions for the process II, gel fraction measured, conditions for the process IV and appearance of the plate prepared.

To summarize the advantages obtained by the invention, the patterned decorative material prepared by the method of the invention which comprises embossing of a powder coating on a steel plate in a specified condition is excellent in appearance, corrosion resistance and weathering resistance and free from the defects of conventional steel plates coated with polyvinyl chloride and the like such as formation of craze and loss of luster.

The patterned decorative material prepared according to the method of the invention is favorably utilized as building materials such as wall materials and interior materials of buildings, housing materials of electric appliances, furniture materials and the like.

What is claimed is:

1. A method of preparation of a patterned decorative material which comprises application of a thermosetting powder coating material comprising a hardener to a base plate, melting of the thermosetting powder coating material by heating, embossing of the coating layer alone while the melted thermosetting powder coating material has a gel proportion formed by a hardening reaction from 15 to 75 weight percent and further heating to form a hardened coating on the base plate.

2. The method according to claim 1, wherein the thermosetting powder coating material is selected from the group consisting of polyester powder coating material, epoxy powder coating material, acryl powder coating material and fluorohydrocarbon resin powder coating material.

3. The method according to claim 1, wherein the embossing of the coating layer is carried out while the melted thermosetting powder coating material has a gel proportion formed by a hardening reaction from 25 to 60 weight percent.

4. The method according to claim 1, wherein the base plate is selected from the group consisting of a steel plate, a zinc plated plate, an aluminum plate, a wooden plate and a plastic plate.

5. The method according to claim 1, wherein the coating layer has a thickness of 30 to 200 micrometers.

6. The method according to claim 1, wherein the hardener is a crosslinking agent selected from the group consisting of melamine resins, blocked polyisocyanate compounds, urethodione compounds, triglycidyl isocyanurate compounds which contain glycidyl groups or glycidyl groups and hydroxyl groups, polybasic acids, amine compounds, amides and mixtures thereof.

7. The method according to claim 1, wherein the powder coating is applied to the base plate by a method selected from the group consisting of flame spray coating, fluidized bed coating, electrostatic spray coating and corona discharge coating.

8. The method according to claim 1, wherein the powder coating is applied to the base plate by a method selected from the group consisting of friction electrostatic spray coating and electrostatic fluidized bed coating.

9. The method according to claim 1, wherein the hardening reaction is conducted at a temperature of 150° to 250° C. for 1 to 30 minutes.

10. The method according to claim 2, wherein the base plate is selected from the group consisting of a steel plate, a zinc plated plate, an aluminum plate, a wooden plate and a plastic plate; the coating layer has a thickness of 30 to 200 micrometers; the hardener is a crosslinking agent selected from the group consisting of melamine resins, blocked polyisocyanate compounds, urethodione compounds, triglycidyl isocyanurate compounds which contain glycidyl groups or glycidyl groups and hydroxyl groups, polybasic acids, amine compound amides and mixtures thereof; the powder coating is applied to the base plate by a method selected from the group consisting of flame spray coating, fluidized bed coating, electrostatic spray coating and corona discharge coating; and the hardening reaction is conducted at a temperature of 150° to 250° C. for 1 to 30 minutes.

11. The method according to claim 3, wherein the thermosetting powder coating material is selected from the group consisting of polyester powder coating material, epoxy powder coating material, acryl powder coating material and fluorohydrocarbon resin powder coating material; the base plate is selected from the group consisting of a steel plate, a zinc plated plate, an aluminum plate, a wooden plate and a plastic plate; the coating layer has a thickness of 30 to 200 micrometers; the hardener is a crosslinking agent selected from the group consisting of melamine resins, blocked polyisocyanate compounds, urethodione compounds, triglycidyl isocyanurate compounds which contain glycidyl groups or glycidyl groups and hydroxyl groups, polybasic acids, amine compounds, amides and mixtures thereof; the powder coating is applied to the base plate by a method selected from the group consisting of flame spray coating, fluidized bed coating, electrostatic spray coating and corona discharge coating; and the hardening reaction is conducted at a temperature of 150° to 250° C. for 1 to 30 minutes.

* * * * *